United States Patent Office 3,793,288
Patented Feb. 19, 1974

3,793,288
BONDING OF THERMOPLASTIC POLYMERS TO
INORGANIC OXIDES PARTICLES
John A. Elder, Jr., Plainfield, N.J., assignor to Union
Carbide Corporation, New York, N.Y.
No Drawing. Original application Oct. 9, 1969, Ser. No.
865,188, now Patent No. 3,650,814, dated Mar. 21,
1972. Divided and this application Apr. 15, 1971,
Ser. No. 134,392
Int. Cl. C08f 45/10
U.S. Cl. 260—41 A                              6 Claims

ABSTRACT OF THE DISCLOSURE

Thermoplastic polymers can be treated directly with an organo-functional silane coupling agent and a resinous copolymer of ethylene and acrylic and/or methacrylic acid so as to enhance their bonding to inorganic oxide substrates thereby providing moldable products with superior physical properties heretofore unattainable.

---

This is a divisional application of application Ser. No. 865,188 filed Oct. 9, 1969 issued as U.S. Pat. No. 3,650,-814, on Mar. 21, 1972.

This invention relates to the treatment of thermoplastic polymers to enhance their bonding to inorganic surfaces. More particularly, this invention relates to the treatment of thermoplastic polymers so as to enhance their bonding to inorganic oxide substrates and to provide thermoplastic polymers filled with such inorganic oxides.

There has been described in the literature and patents procedures for filling thermoplastic polymers with inorganic oxides. In the initial development of such art, treated inorganic oxide materials, particularly in particulate form, were introduced and blended into thermoplastics polymers and the resulting mixtures were molded by conventional methods such as casting, injection molding, extrusion, rotational molding and the like, to form inorganic oxide reinforced plastic articles. However, it had been found that the properties of such filled articles, though improved over the plastic per se, did not meet the quality level which the art expected and desired. Then the art attempted treatment of such inorganic oxide particulate material for the purpose of enhancing its bonding relationship with respect to the thermoplastic polymers. One treatment involved coating the inorganic oxide polymer material with silicone coupling agents, that is, the hydrolyzates of the well known silane coupling agents. This treatment lended some improvement in the properties of the composite structure but, again, did not yield the properties believed possible from this type of system.

This invention involves a new concept in the formation of such composite system wherein the treatment effected for the purpose of enhancing the bonding relationship between the thermoplastic polymers and the inorganic oxide is achieved by a special treatment of the polymer itself rather than the art-directed effort to treat the inorganic oxide first. This invention inovlves supplying upon the surface of a thermoplastic polymer an organo-functional silane coupling agent and a resinous copolymer of ethylene and acrylic acid and/or methacrylic acid. It has been determined that such a treated polymer when blended and molded in combination with particulate inorganic oxide yields significant improvements in processing and properties over the methods heretofore employed which involved treatment of the inorganic oxide surface.

The thermoplastic polymers treated in accordance with this invention are any of those having sufficient molecular weight and flow characteristics to be molded by such conventional means such as described above. Particularly preferred polymers are the olefin polymers such as polyethylene (high and low density), polypropylene, poly-1-butene, polystyrene, poly-alpha-methylstyrene, polybutadiene-1,3, and the like. Other useful polymers employable in the practice of this invention include polyvinylchloride, polyvinylacetate, polymethylmethacrylate, polyethylacrylate, copolymers of styrene and acrylonitrile, block copolymers of acrylonitrile and butadiene-1,3, terpolymers of buadiene-1,3, styrene and acrylonitrile, nylons (such as polyhexamethyleneadipamide, polytetramethylenesebacamide, polyepsiloncaprolactam, and the like), the polyimideazolines, polyesters (such as polyethyleneterephthalate, poly-1,4-cyclohexyleneterephthalate, and the like), the oxy-methylene homopolymers and copolymers (the polyformaldehyde polymers), polycarbonates such as the reaction product of phosgene or monomeric carbonate esters with bis-Phenol A [2-bis(4-hydroxyphenyl)propane], and the like, polyarylene polyethers such as described in U.S. Pat. No. 3,264,536, patented Aug. 2, 1966, and the like.

The organo-functional silane coupling agents suitable for use in the practice of this invention comprise those which are condensable with the carboxy group of the ethylene-acrylic and/or methacrylic acid copolymers. These organo-functional silanes are those which on hydrolysis and condensation form siloxanes characterized by repeating unit formula:

(I)                    [XR'SiO$_{3/2}$]

wherein X is a functional group which is condensable with a carboxylic acid group, e.g., functional groups such as

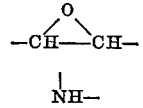

HS—, HO—, O=C=N—, and the like; and R' is a saturated hydrocarbon radical containing at least 3 carbon atoms in sequence therein separating X from Si and bonded to both, provided that when X is HS—, R' may contain 2 carbon atoms in sequence separating the HS— from Si. These siloxanes are obtained by the hydrolysis and condensation of silanes such as those encompassed by the formula:

(II)                    XR'SiY$_3$ wherein Y is any hydrolyzable group such as alkoxy, aroxy, halogen, amino, and the like. It should be understood that in the case of the silane where X is O=C=N, the same functional group is not to be found in the siloxane since isocyanates are unstable to hydrolysis. However, the reaction product of isocyanate with water forms

which is a functional group pursuant to this invention. The isocyanate group can be put into the siloxane by phosgenation of an omino substituted siloxane followed by dehydrohalogenation. The siloxane will still be capable of further reaction and will securely bond to the inorganic substrate.

Specific illustrations of the aforementioned silanes are the following:

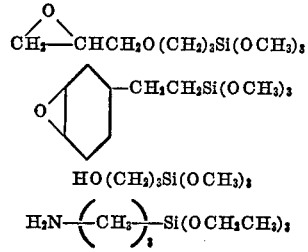

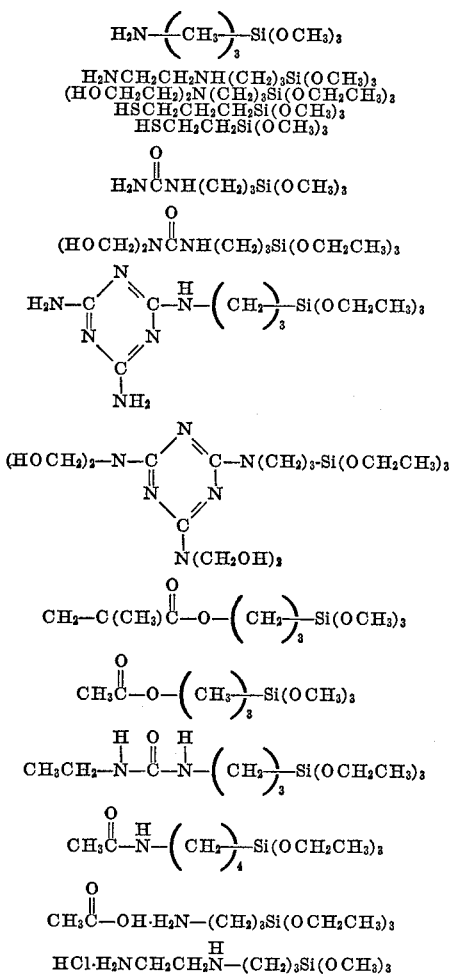

The silanes containing ester groups in the organic radical are believed capable of providing hydroxyl groups by in situ hydrolysis of the ester groups during curing of the ethylene-acrylic and/or methacrylic acid copolymer on the substrate.

The ethylene-acrylic and/or methacrylic acid copolymers employed in the practice of this invention are described in U.S. Pat. No. 3,264,272, patented Aug. 2, 1966, and U.S. Pat. No. 3,321,819, patented May 30, 1967. Though these patents are directed to the salt form of the copolymers, it is to be understood that in the practice of this invention the free acid copolymers and the salt form thereof may be employed. Moreover, in the practice of this invention one may employ a copolymer containing a low concentration of polymerized acrylic and/or methacrylic acid. In the practice of this invention acrylic and/or methacrylic acid content may be as low as about 5 weight percent based on the weight of the copolymer. Preferably, the copolymer contains at least about 14 to about 55 weight percent, based on the weight of the copolymer of the polymerized acrylic and/or methacrylic acid. Most desirably, the copolymers do not have a melt index greater than about 200 as expressed in decigrams per minute most preferably not greater than about 100. The remaining weight of the copolymer is, of course polymerized ethylene.

For the purpose of describing the invention, emphasis has been made to a copolymer of three potential ingredients, to wit, ethylene, acrylic acid and methacrylic acid. However, for the purposes of scope, this invention is not limited to just this class of copolymers. Broadly speaking, the copolymer can be expressed as a polymer of an alpha-olefin having the general formula $RCH=CH_2$ wherein R is a radical selected from the group consisting of hydrogen, alkyl radicals having from 1 to 8 carbon atoms and phenyl. The acrylic acid and/or methacrylic acid can be substituted for in part or completely by other alpha, beta-ethylenically unsaturated carboxylic acids, preferably having from 3 to 10 carbon atoms therein. In addition to the two acids mentioned previously herein, there is included, by way of example, ethacrylic acid, itaconic acid, maleic acid, fumaric acid, 9-decenoic acid, and the like. The copolymer may be made originally from the respective anhydrides of the above acids or from the acid itself. It is to be emphasized for the purposes of this invention the use of acrylic and/or methacrylic acid are highly preferable but by no means is this invention restricted by this selection. Thus any of the alpha, beta-ethylenically unsaturated carboxyl acids as defined above, which term includes acrylic and methacrylic acids, can be advantageously employed. As mentioned previously, the copolymer can be at least partially saponified with a monovalent base before use. The degree of saponification, when saponified, should be at least sufficient to cause the polymer to be more soluble in water. The above limits on the amount of saponification are not intended to be so restrictive because in the operative practice of this invention the amount of saponification should be determined as that amount which allows dissolution in water at 100° C. of at least about 25 weight percent of the copolymer.

The silane coupling agents and the ethylene-acrylic acid copolymers can be provided at a surface of the thermoplastic polymer particles in many ways. One method involves depositing particles of the polymer into liquid baths of the silane and ethylene-acrylic acid copolymer or into liquid baths comprising a mixture of the two. Such method does not lend itself to good control of the concentration of the components on the surface of the polymer. Another method which may be employed involves tumbling the thermoplastic polymer in a closed vessel and injecting the silane and the ethylene acrylic acid copolymer therein alone or in admixture in the form of liquids. Such injection may be effected by a thin stream or through use of a spray nozzle. Preferred results are obtained when a mixture of the silane and the copolymer are sprayed into the tumbled particles. Another method for incorporation of these treating components on the surface of the polymer particles involves introducing these components separately or together into an inert gas stream such as carbon dioxide, nitrogen, methane, argon, and the like; and feeding said stream into a cylinder comprising a bed of the polymer particles to effect fluidization thereof. Conventional fluidization procedures and apparatus may be employed. It is evident that the fluidization procedure readily lends itself to a continuous operation scheme.

It is preferred that in the operation of such fluidization treatment that one can control the amount of the treating component to be introduced into the bed so as to avoid the presence of such components in the off gas leaving the bed.

The treating components may be provided neat or in solution or suspension using solvents or non-solvents as the case requires. The treating components may also be supplied to the polymer particles as a molten mixture, preferably so in the case of ethylene-acrylic acid copolymer. Since the silane is a liquid at treating conditions, there is no difficulty in coating the polymer particle with this material. However, in the case of the ethylene-acrylic acid copolymer it is often necessary to liquify it either by melting or by solution with a solvent therefor or by dispersing particles thereof in a solvent medium. The copolymers may also be converted into a salt form and this readily enhances the solubility of the copolymer in water, allowing it to be more easily dispersed therein. Illustrative of such salts are the ammonium salt, amine salt, and alkali metal salt. The preferred salt form is the ammonium salt.

To obtain the desired results, the amount of the silane coupling agents provided on the surface of the polymer particles does not exceed about 1 percent by weight of the polymer particles being treated and preferably is not less than about .01 percent based on the weight of the polymer particles. Usually, at least about 0.1 weight percent of the silane is supplied to the polymer surface. In some cases, not more than about .07 weight percent of silane is required. The silane can be supplied to the particles in the form of its hydrolyzate, produced by mixing the silane in an aqueous medium.

The ethylene-acrylic acid copolymer, per se, or any salt form thereof, is desirably used in very small amounts. Typically not more than about 1.0 weight percent of the copolymer, based on the weight of the polymer particles being treated, is provided thereon. It is possible to obtain beneficial results using amounts of copolymer as little as about 0.01 weight percent, based on the weight of the polymer particles. Preferably, one employs an amount of copolymer in the range of from about 0.1 to about 0.6 weight percent based on the weight of the polymer particles.

As is already known in the art, an inorganic oxide-reinforced plastic exhibits increased flexural strength and improved heat resistance. Illustrative of such inorganic oxide are glass fiber, preferably cut to a length not more than about ½ inch, siliceous fillers (such as hydrated silica, silica aerogel, fume silica, and the like), aluminum silicates, titanium dioxide, magnesium silicate, magnesium aluminum silicates, whiting, and the like. In the usual practice organic oxide particles, other than glass fiber, are typically blended into the molten plastic resin and the filled resin is then extruded and cut into particles which are molded to the desired shape. In the case of glass fiber, particles of the resin are dry blended with the glass fiber and through molding, a shaped product is formed. It has been determined that when the treated polymer particles, as described previously, are blended in the aforementioned inorganic oxide and then subjected to molding conditions under sufficient heat to effect fusion of the polymer particles, significant advantages are obtained, such as improvement in flexural strength and substantial improvement in the heat distortion characteristics of the shaped article.

It has been determined that when treatment, such as described above, is given to the glass fibers rather than to the polymer particles and the mixture of all such particle components is achieved under a substantial shear force, such as in a screw injection molding machine, a substantial amount of the glass fiber bundles are not effectively dispersed, thereby adversely affecting the appearance of the sheet as well as its physical properties.

The explanation for the above result appears to occur because of the manner in which the fiber is provided by glass fiber producers. In the manufacture of glass, continuous multiple filaments of glass are formed from a bushing and these continuous multiple filaments are gathered up as a bundle. Then the bundles are cut into desired lengths to form bundles of staple glass fibers. When this glass fiber is treated with the silane coupling agent or its hydrolyzate and the ethylene-acrylic acid copolymer, and the resulting treated glass fiber bundles are mixed under substantial shear forces with particles of thermoplastic polymers there is noted a separation effect whereby bundles of the glass fiber develop on the surface of the extruded plastic article adversely affecting its appearance and to some extent adversely affecting its physical properties. However, when the treatment of silane or its hydrolyzate and the ethylene-acrylic acid copolymer is coated on the polymer particles rather than on the glass particles, such effect is not apparent and intimate dispersion of the glass fibers through the polymer matrix is achieved to produce an extruded plastic article having a smooth exterior and having the desired improvement in flexural strength and heat distortion noted above.

In order to characterize this invention with regard to specific embodiments thereof reference is made to the following examples. It is not intended that these examples shall in any way act to limit the scope of this invention. In the following examples the abbreviation min. is for the term minute and all values for melt index are given in decigrams per minute at 190° C.

EXAMPLE 1

A 150 gram masterbatch consisting of 102.2 grams of high density polyethylene, in powdered form as received from the polymerization reactor, having a melt index of 9.2 (decigrams/min. at 190° C.) and a density of 0.958; 25.3 grams of ethylene-acrylic acid copolymer (in pellet form) containing 20% acrylic acid per weight of polymer having a melt index of 50 (decigrams/min. at 190° C.) and a density of 0.96 with an ultimate tensile strength of 2100 p.s.i. (ASTM D–638–64T) and 22.5 grams gamma-methacryloxypropyltrimethoxysilane was prepared by first softening the polyethylene at a temperature of 120° C. on a two roller roll mill and incorporating the other ingredients. This composite was removed from the roll mill in sheet form having an aproximate thickness of ⅛ inch. The sheet was rendered brittle with Dry Ice, shattered, fed to a grinding mill (packed in Dry Ice) and ground to a powdered form.

A 46.6 gram portion of this masterbatch was blended with 1354 grams of high density polyethylene, in powdered form as received from the polymerization reactor, and 600 grams of chopped fiber glass having an average fiber length of ¼ inch, a filament diameter of .00051 inch having 200–400 filments per bundle, for 5 minutes in a horizontal drum blender, allowing 50 percent free space. The 2000 gram batch (hereinafter designated Batch 1) was then fed to a 3 oz. single-screw, reciprocating injection machine to mold standard ASTM tensile, flexural and impact test speciments.

The above process was repeated to produce a batch containing no ethylene-acrylic acid copolymer; this batch hereinafter is designated Batch 2.

The above-described process was repeated to produce a batch containing no gamma-methacryloxypropyltrimethoxysilane; this batch is hereinafter designated as Batch 3.

A chart comparing relevant physical properties of the three processed batches is presented below.

TABLE 1

| Batch: | Flexural strength [1] (p.s.i.) | Flexural modulus [1] (p.s.i.) | Izod Impact [2] (ft.-lbs./in.) | Heat deflection [3] (° C.) |
|---|---|---|---|---|
| 1 | 10,200 | 670,000 | 2.0 | 122.5 |
| 2 | 6,900 | 605,000 | 1.5 | 100.4 |
| 3 | 9,100 | 650,000 | 2.0 | 96.6 |

[1] ASTM D-790-66 (¼" x ½" x 5" specimen, rate 0.2 in./min.)-secant modulus measured at point of 0.1 inch deflection.
[2] ASTM D-256-56 (¼" notch).
[3] ASTM D-648-56 (¼" x ½" x 5" specimen, 264 p.s.i.).

EXAMPLE 2

This example demonstrates the application of ethylene-acrylic acid copolymer and gama-methacryloxypropyltrimethoxysilane co-ingredients directly on the surface of high density polyethylene, thereby eliminating the need for incorporation by roll milling and consequently grinding.

Firstly, a suspension, hereinafter designated Suspension A, was prepared by dispersing 70 grams of a 20 weight percent solids ammoniacal dispersion (pH 9.0) of ethylene-acrylic acid copolymer containing 20% acrylic acid per weight of polymer (melt index of 50, density 0.96, ultimate tensile 2100 p.s.i.) in 210 cc. of water. Secondly, a solution, hereinafter designated Solution B, was prepared by co-mixing 12.5 grams of gamma-methacryloxypropyltrimethoxysilane with 200 cc. of petroleum ether (boiling range 37–60° C.).

Suspension A was uniformly sprayed on 1374 grams of high density polyethylene as set forth in Example 1. The treated polyethylene was dried in an oven at 77° C. Thereafter Solution B was uniformly sprayed on the treated polyethylene and the petroleum ether and residual water were allowed to evaporate. The resultant dried polyethylene weighed 1400 grams.

The 1400 grams of treated polyethylene were dry blended with 600 grams of chopped fiber glass and the blend was injection molded to standard ASTM test specimen as previously described in Example 1. This batch is hereinafter designated Batch 4.

The above process was repeated to produce a batch containing no ethylene-acrylic acid copolymer and no gamma-methacryloxypropyltrimethoxysilane; this batch is hereinafter designated as Batch 5.

A comparison chart of the relevant physical properties of Batch 4 and Batch 5 are presented below.

| Batch: | Flexural strength [1] (p.s.i.) | Flexural modulus [1] (p.s.i.) | Izod [2] (ft.-lbs./in.) | Heat deformation [3] (° C.) |
|---|---|---|---|---|
| 4 | 8,230 | 603,000 | 1.8 | 113 |
| 5 | 6,440 | 618,000 | 1.4 | 90 |

Note.—See footnotes 1, 2, 3 bottom of Table 1.

EXAMPLE 3

To demonstrate the combined effect of various proportions of gamma-methacryloxypropyltrimethoxysilane and ethylene-acrylic acid copolymer on resultant physical properties of different grades of polyethylene filled with fiber glass, several batches were prepared employing the following procedure.

A 1400 gram batch of high density polyethylene, as described in Example 1, was stirred in a Menschel mixer and measured quantities, stated in the tables below, of ethylene-acrylic acid copolymer and gamma-methacryloxypropyltrimethoxysilane were sprayed therein, as described in Example 2. Ethyleneacrylic acid copolymer was in the form of an aqueous dispersion, as previously described in Example 2.

After spraying was complete, the treated polyethylene was dried on trays in an oven at 77° C. for 18 hours. The dried polyethylene was blended with 600 grams of chopped fiber glass in a horizontal drum blender, the blend was then injection molded to standard ASTM test specimens as previously described in Examples 1 and 2.

The results of several batches employing three qualities of high density polyethylene are tabulated below.

TABLE 3a [5]

| Silane [8] (wt. percent) | EAA [9] (wt. percent) | Flexural strength [1] (p.s.i.) | Flexural modulus [2] (p.s.i.) | Izod [3] (ft. lb./in.) | Heat deformation [4] (° C.) |
|---|---|---|---|---|---|
| 0 | 0.4 | 11,000 | 610,000 | 1.9 | 1.14 |
| 0.0875 | 0.1 | 11,800 | 620,000 | 2.1 | 1.23 |
| 0.175 | 0.2 | 12,200 | 630,000 | 2.4 | 1.34 |
| 0.35 | 0.4 | 12,500 | 610,000 | 2.5 | 1.21 |
| 0 | 0 | 6,400 | 540,000 | 2.3 | 85.4 |

Note.—See footnotes 1 through 9 bottom of Table 3c.

TABLE 3b [6]

| Silane [8] (wt. percent) | EAA [9] (wt. percent) | Flexural strength [1] (p.s.i.) | Flexural modulus [2] (p.s.i.) | Izod [3] (ft. lb./in.) | Heat deformation [4] (° C.) |
|---|---|---|---|---|---|
| .35 | 0.4 | 13,400 | 690,000 | 3.1 | 122 |
| .175 | 0.2 | 13,900 | 680,000 | 2.9 | 125 |
| 0 | 0 | 7,700 | 600,000 | 2.6 | 117 |

Note.—See footnotes 1 through 9 bottom of Table 3c.

TABLE 3c [7]

| Silane [8] (wt. percent) | EAA [9] (wt. percent) | Flexural strength [1] (p.s.i.) | Flexural modulus [2] (p.s.i.) | Izod [3] (ft. lb./in.) | Heat deformation [4] (° C.) |
|---|---|---|---|---|---|
| 0.35 | 0.4 | 13,800 | 680,000 | 3.0 | 124 |
| 0.175 | 0.2 | 13,600 | 700,000 | 3.3 | 125 |
| 0 | 0 | 7,800 | 590,000 | 2.3 | 104 |

[1] ASTM D-790-66 (1/4″ x 1/2″ x 5″ specimen, rate 0.2 in./min.)-secant modulus measured at point of 0.1 inch deflection.
[2] Same as footnote (1).
[3] ASTM D-256-56 (1/8″ notch).
[4] ASTM D-648-56 (1/4″ x 1/2″ x 5″ specimen, 264 p.s.i.).
[5] Table 3a.—High density polyethylene, melt index of 4.0, density of 0.962.
[6] Table 3b.—High density polyethylene, melt index of 16.0, density of 0.955.
[7] Table 3c.—High density polyethylene, melt index of 19.0, density of 0.965.
[8] Gamma-methacryloxypropyltrimethoxysilane.
[9] Ethylene-acrylic acid copolymer (melt index, 50 decigrams/min. at 190° C.), containing 20 percent acrylic acid per weight of polymer.

EXAMPLE 4

This example demonstrates enhanced physical properties of impact strength and heat distortion of glass fiber filled polypropylene when treated with silane and ethylene-acrylic acid copolymer.

Firstly, 28 grams of an ammoniacal dispersion of 20 weight percent ethylene-acrylic acid copolymer (pH 9.0) was sprayed on 1400 grams of stirred powdered polypropylene (Shell-5520, melt index 5; sold by Shell Chemicals Co., Shell Oil Co., New York, N.Y.) in a continuously operated Henschel mixer. Secondly, 4.9 grams of gamma-methacryloxypropyltrimethoxysilane was uniformly sprayed on the stirred polypropylene. After spraying, vigorous stirring continued for approximately 1 minute. The treated polypropylene particles were oven dried for 18 hours at 77° C.

The treated polypropylene was then blended with 600 grams of commercial chopped fiber glass as described in Example 1, and the blend was injection molded to standard ASTM specimens, as previously set forth in Examples 1, 2 and 3; and these specimens hereinafter referred to as "Sample 1."

A second batch of treated polypropylene was prepared using the preceding method with 14 grams of the 20 percent solids ammoniacal dispersion of ethylene-acrylic acid (pH 9.0) and 2.45 grams of the gamma-methacryloxypropyltrimethoxysilane. This batch was blended with chopped fiber glass, as described in Example 1, and the blend injection molded into specimens in the manner set forth in Examples 1, 2 and 3. These specimens are hereinafter refered to as "Sample 2."

A third batch of polypropylene was prepared without treatment with either ethylene-acrylic acid copolymer or gamma-methacryloxypropyltrimethoxysilane. This untreated batch was blended with chopped fiber glass as described in Example 1; the blend injection molded in the manner set forth in Examples 1, 2 and 3, and the specimens hereinafter referred to as "Sample 3."

Table 4 compares the physical properties of the three samples.

TABLE 4

| Sample No. | Flexural strength [1] (p.s.i.) | Flexural modulus [1] (p.s.i.) | Izod [2] (ft. lbs./in.) | Heat deformation [3] (° C.) |
|---|---|---|---|---|
| 1 | 10,000 | 620,000 | 4.0 | 148.2 |
| 2 | 10,000 | 685,000 | 3.5 | 149.1 |
| 3 | 11,000 | 770,000 | 3.2 | 129 |

Note.—See footnotes 1, 2 3 bottom of Table 1.

EXAMPLE 5

Herein presented is a chart comparing the physical properties of molded products; the first sample therein treated with gamma-aminopropyltrimethoxysilane, and the second sample therein treated with gamma-methacryloxypropyltrimethoxysilane.

The method employed to produce said samples is that method previously described in Example 3.

TABLE 5.—HIGH DENSITY POLYETHYLENE, MELT INDEX OF 4.0, DENSITY OF 0.962

| Silane (wt. percent) | EAA (wt. percent) | Flexural strength [1] (p.s.i.) | Flexural modulus [1] (p.s.i.) | Izod [2] (ft. lbs./in.) | Heat deformation [3] (° C.) |
|---|---|---|---|---|---|
| 0.31 | 0.4 | 10,800 | 698,000 | 1.6 | 120.4 |
| 0.35 | 0.4 | 13,300 | 680,000 | 2.4 | 126.8 |

NOTE.—See footnotes 1, 2, 3, bottom of Table 1.

In the aforementioned examples all weight percentages for silane and ethylene acrylic acid copolymer are based on the weight of resin present in the sample.

What is claimed is:

1. The process of molding thermoplastic polymers with inorganic oxide filler, which comprises treating thermoplastic polymer particles by providing on the surface thereof,
    (a) from about 0.01 to about 1 percent by weight based on the weight of the polymer particles of an organo-functional siloxane obtained by the hydrolysis and condensation of a silane having the formula:
    $$XR'SiY_3$$
    wherein X is a functional group which is condensible with a carboxylic acid group and R' is a saturated hydrocarbon radical containing at least 3 carbon atoms in sequence therein separating X from Si and bonded to both, provided that when X is HS—, R' may contain 2 carbon atoms in sequence separating the HS— from Si, and Y is a hydrolyzable group; and
    (b) from about 0.01 to about 1 percent by weight based on the weight of the polymer particles of a copolymer of alpha-olefin, and an alpha, beta-ethylenically unsaturated carboxylic acid; blending said inorganic oxide filler particles with said treated thermoplastic polymer and then molding said blend with sufficient heat to effect fusion of the treated thermoplastic polymer.

2. The method of claim 1 wherein the inorganic oxide filler is glass fiber.

3. The product produced by the method of claim 1.

4. The product produced by the method of claim 2.

5. The product produced by the process of claim 3 wherein (a) is gamma - methacryloxypropyltrimethoxysilane.

6. The product produced by the process of claim 3 wherein (a) is gamma-aminopropyltriethoxysilane.

References Cited

UNITED STATES PATENTS

| 3,437,550 | 4/1969 | Paul, Jr. | 260—41 |
| 3,459,691 | 8/1969 | Ostrowski | 260—41 B X |

LEWIS T. JACOBS, Primary Examiner

U.S. Cl. X.R.

260— 37 R, 37 PC, 40 R, 41.5 A

UNITED STATES PATENT AND TRADEMARK OFFICE
CERTIFICATE OF CORRECTION

PATENT NO. : 3,793,288

DATED : February 19, 1974

INVENTOR(S) : J.A. Elder, Jr.

It is certified that error appears in the above-identified patent and that said Letters Patent is hereby corrected as shown below:

| | |
|---|---|
| Column 1, lines 36-37 | "thermoplastics" should read -- thermoplastic -- |
| Column 1, line 59 | "inovlves" should read -- involves -- |
| Column 2, line 8 | "buadiene" should read -- butadiene -- |
| Column 2, line 57 | "omino" should read -- amino -- |
| Column 3, line 25 | the formula should read |

$$CH_2=C(CH_3)\overset{O}{\overset{\|}{C}}-O\text{-}(CH_2)_3Si(OCH_3)_3$$

| | |
|---|---|
| Column 3, fifth formula from the bottom of list | the formula should read |

$$CH_3\overset{O}{\overset{\|}{C}}-O\text{-}(CH_2)_3Si(OCH_3)_3$$

| | |
|---|---|
| Column 6, line 23 | "aproximate" should read -- approximate -- |
| Column 6, line 37 | "speciments" should read -- specimens -- |
| Column 7, line 41 | "Menschel" should read -- Henschel -- |

UNITED STATES PATENT AND TRADEMARK OFFICE
CERTIFICATE OF CORRECTION

PATENT NO. : 3,793,288
DATED : February 19, 1974
INVENTOR(S) : J.A. Elder, Jr.

It is certified that error appears in the above-identified patent and that said Letters Patent is hereby corrected as shown below:

Column 7, Table 3a[5]     Last column, under "(°C.) the first four readings should read

-- 114 --
-- 123 --
-- 124 --
-- 121 --

[SEAL]

Signed and Sealed this

Tenth Day of June 1986

Attest:

DONALD J. QUIGG

Attesting Officer     Commissioner of Patents and Trademarks